Feb. 10, 1948.  K. O. KEARNEY  2,435,716
CONTROL STRUCTURE
Filed Aug. 14, 1944

INVENTOR.
Kenneth O. Kearney
BY Bair & Freeman
Atty's

Patented Feb. 10, 1948

2,435,716

UNITED STATES PATENT OFFICE 2,435,716

CONTROL STRUCTURE

Kenneth Orington Kearney, Syracuse, Ind., assignor to Penn Electric Switch Co., Goshen, Ind., a corporation of Iowa Application August 14, 1944, Serial No. 549,465

8 Claims. (Cl. 200—83)

This invention relates to a control structure of the "solid fill" type wherein means is provided for rapid control action within a chosen range constituting the actuating range of a control device operated by the diaphragm structure.

One object of the invention is to provide a housing structure with a pair of diaphragms of unequal flexibility and so arranged in relation to stops and a control device that flexing of the diaphragms occurs in a predetermined order, which results in a relatively rapid movement within the control range of the control device.

Another object is to provide a pressure housing having a pair of diaphragms, one larger than the other, whereby it will flex initially and upon reaching a stop provided for it, the smaller diaphragm will flex and operate the control device.

Still another object is to provide a stop for the small diaphragm after it has operated the control device and a spring for holding the stop of the large diaphragm so that said stop can move upon an overrun caused by further build-up of pressure after the control device has operated and the small diaphragm has engaged its stop.

A further object is to provide means for adjusting the stop for the large diaphragm and thereby changing the range within which the smaller diaphragm will operate and in turn operate the control device.

With these and other objects in view, my invention consists in the construction, arrangement and combination of the various parts of my control structure, whereby the objects contemplated are attained, as hereinafter more fully set forth, pointed out in my claims and illustrated in the accompanying drawings, wherein:

Figure 1:
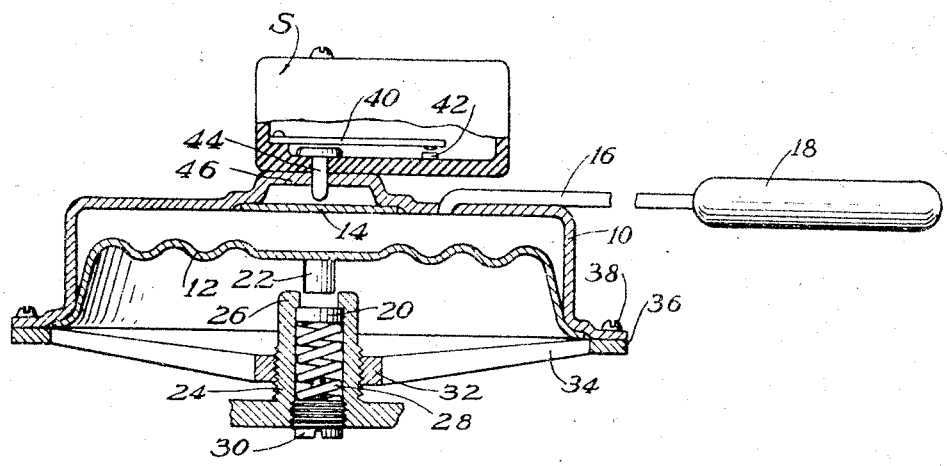
Figure 1 is a partial sectional view through a control structure embodying my invention and showing the parts in position when the pressure wthin the diaphragm housing is down.

On the accompanying drawing I have used the reference numeral 10 to indicate a diaphragm housing and 12 and 14 to indicate first and second diaphragms associated therewith and responsive to pressure build-up within the housing. The diaphragms 12 and 14 may be soldered or brazed to the housing 10 to form a closed compartment, and a capillary tube 16 may be connected therewith and terminate in a capillary bulb 18. The housing, tube and bulb may be filled with a "solid charge" such as mercury or the like, whereby temperature changes affecting the bulb 18 will change the volume of the charge and consequently flex the diaphragms 12 and 14.

The diaphragms are of different character, the diaphragm 12 being more flexible than the diaphragm 14. This may be secured by having them of different thickness or different diameter, or both. The diaphragm 14 is shown both smaller in diameter and thinner than the diaphragm 12 by way of illustration, and the diaphragm 12 may be corrugated as shown in Figure 1 to increase flexibility.

A stop 20 in the form of a disc is provided in the diaphragm 12, the diaphragm having a projection 22 to engage the stop. The stop 20 is carried in an adjusting sleeve 24 and is constrained to engage an annular shoulder 26 thereof by a relatively heavy spring 28. The spring may be adjusted as to tension by means of an adjusting screw 30. The screw 30 is carried by the sleeve 24 while the sleeve is threaded in a hub 32 connected by spokes 34 to a rim 36. The rim in turn is connected with the housing 10 as by screws 38.

A control device, such as the switch S, is adapted to be operated by the control structure. The switch S may include a movable contact blade 40 and a stationary contact 42. The blade 40 may be operated by a pin 44 projecting through a wall 46 of the housing 10, which wall serves as a limit stop for the diaphragm 14, as will hereinafter appear.

Practical operation

Figure 2:
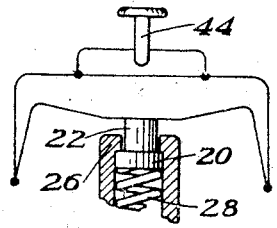
Figures 2, 3 and 4 are diagrammatic views showing, respectively, the build up of pressure to the lower operating point, the build up of pressure to the upper operating point and the overrun pressure after the over-run point has been reached.

In the operation of my control structure, initial build-up of pressure within the housing 10 causes the diaphragm 12 to flex while permitting the diaphragm 14 to remain substantially unflexed as in Figure 2, until the projection 22 engages the stop 20. Such engagement occurs at the lower point of control for the switch S and is adjustable by means of the sleeve 24.

Further build-up of pressure results in the diaphragm 14 flexing because the spring 28 is strong enough to hold the stop 20 against the shoulder 26. Since the diaphragm 14 is relatively small in area, the flexing will be relatively rapid per degree of temperature change, thereby giving a desired fast acting movement for the switch S within its operating range. This results in a relatively close differential as compared with the usual single diaphragm type of control structure.

Figure 3:
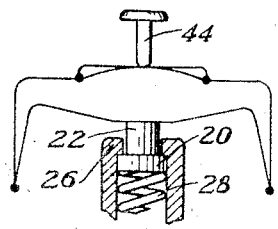
Figure 4:
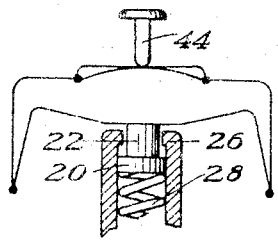

After the switch S has been operated, the diaphragm 14 engages the wall 46, which stops its further movement as in Figures 3 and 4, and then if there is pressure over-run, the projection 22 will move the stop disc 20 downwardly as in Figure 4, in opposition to the spring 28.

Upon temperature drop after the disk 20 engages the stop flange 26 as in Figure 3, there will be relatively rapid flexing of the diaphragm 14 from the position of Figure 3 to the position of Figure 2—again in the operating range of the switch, and finally the diaphragm 12 will move from the position of Figure 2 to the position of Figure 1 if the pressure continues to recede.

With the disclosed arrangement I am able to provide for under-run and over-run of pressure beyond the upper and lower control points for the switch S, wherein movement of the diaphragm 12 is substantially small per degree of temperature change, yet providing greater movement per degree of temperature change within the movement of the control switch or other control device operated by the less flexible diaphragm 14. This is a desirable advantage in a control device particularly where temperature ranges may be very great, as between zero and 120° for a refrigerator control during operating periods and during periods when the refrigerator is out of service and the temperature may run up to as high as 120° in a store-room or the like.

The stop and spring arrangement 20—28 permits the desired action of the two diaphragms so that the required two or three-thousandths inch of movement for tripping the switch S may be had with a very small change in temperature, and without the necessity of requiring the diaphragm 14 to flex throughout the entire over-run or under-run range. Deflection of this diaphragm occurs only in the control range and the diaphragm 14 can therefore be relatively stiff, yet secure the desired action in relation to the other elements of the control structure.

Some changes may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. In a control structure, a housing having a pair of diaphragms for movement in response to pressure changes within said housing, one of said diaphragms having a high spring rate and the other of said diaphragms having a low spring rate, a control device for operation by said high rate diaphragm, a stop for said low rate diaphragm after it has responded to initial build-up of pressure in said housing to a predetermined control point for said control device, a spring holding said stop during further pressure build-up, said control device being operated by said high rate diaphragm during such further pressure build-up, said spring permitting movement of said stop and thereby flexing of said low rate diaphragm after the control device has been operated and during pressure overrun.

2. In a control structure, a housing having a pair of diaphragms for movement in response to pressure changes within said housing, one of said diaphragms having a high spring rate and the other of said diaphragms having a low spring rate, a control device for operation by said high rate diaphragm, a movable stop for direct engagement by said low rate diaphragm after it has responded to initial build-up of pressure in said housing to a predetermined control point for said control device, a spring holding said stop during further pressure build-up, said control device being operated by said high rate diaphragm during such further pressure build-up.

3. In a control structure, a housing having a pair of diaphragms for movement in response to pressure changes within said housing, one of said diaphragms having a high spring rate and the other of said diaphragms having a low spring rate, a control device for operation by said high rate diaphragm, a stop for direct engagement by said low rate diaphragm after it has responded to initial build-up of pressure in said housing to a predetermined point, said stop, during further pressure build-up of pressure, retaining said low rate diaphragm against movement while said control device is being operated by said high rate diaphragm, and a stop for said high rate diaphragm after it has operated said control device.

4. A control structure comprising a housing having a pair of diaphragms for movement in response to pressure changes within said housing, one of said diaphragms having a high spring rate and the other of said diaphragms having a low spring rate, a control device operable by said high rate diaphragm, and a movable stop for said low rate diaphragm after it has responded to initial pressure build-up and during further pressure build-up, means to hold said movable stop against movement during such further pressure build-up, said control device being operated by said high rate diaphragm during such further pressure build-up, said means permitting flexing of said low rate diaphragm after the control device has been operated and during overrun of pressure.

5. In a control structure, a housing having a pair of diaphragms of unequal size for movement in response to pressure changes within said housing, a movable stop for the larger diaphragm, said larger diaphragm being normally spaced therefrom and, after initial build-up of pressure within said housing, being engaged thereby, a spring for holding said stop and said larger diaphragm during further build-up of pressure while the smaller diaphragm is being flexed, and a control device operated by the flexing of said smaller diaphragm, said spring permitting flexing of said larger diaphragm beyond the operating range of said control device.

6. A control structure comprising a housing having opposite walls comprising diaphragms of unequal size for movement in response to pressure changes within said housing, a movable stop for the larger diaphragm after initial build-up of pressure within said housing, a stationary stop for said movable stop, a spring for holding said larger diaphragm and said movable stop against said stationary stop during further build-up of pressure while the smaller diaphragm is being flexed, a control device operated by the flexing of said smaller diaphragm, and a stop for said smaller diaphragm after it has operated said control device, said spring permitting flexing of said larger diaphragm and movement of said movable stop away from said stationary stop against the action of said spring after said smaller diaphragm has engaged its stop.

7. In a control structure, a housing having a pair of diaphragms responsive to changes in pressure therewithin, one of said diaphragms having greater flexibility than the other, a control device for operation by the less flexible diaphragm, and means for causing rapid action of said control device within a chosen range comprising a stop for the more flexible diaphragm and engaged directly thereby at the end of said chosen range, the less flexible diaphragm thereupon being flexed upon pressure build-up within said chosen range, and means to positively stop said less flexible diaphragm after it has reached the upper limit of said range.

8. A control structure comprising a pressure housing having first and second diaphragms, the first diaphragm responding readily to pressure changes and the second one less readily thereto, a stop for said first diaphragm after it has responded to pressure build-up to the lower control point for a control device, said second diaphragm thereafter flexing, a control device operated by said second diaphragm, a positive stop for said second diaphragm, and means to permit overrun of said first diaphragm comprising a spring permitting movement of said first stop after said second diaphragm has engaged its stop, said spring having sufficient tension to overcome the tension of said second diaphragm and thereby permit its movement after said first diaphragm engages and moves said first mentioned stop.

KENNETH ORINGTON KEARNEY.

REFERENCES CITED

The following references are of record in the file of this patent:

UNITED STATES PATENTS

| Number | Name | Date |
|---|---|---|
| 353,186 | Westinghouse | Nov. 23, 1886 |
| 1,661,346 | Sawyer | Mar. 6, 1928 |
| 1,925,530 | Gotthardt | Sept. 5, 1933 |